Figure 1:
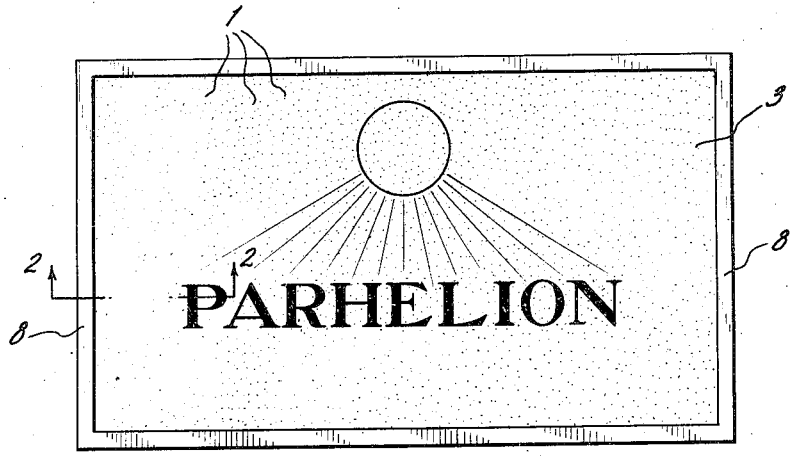

May 18, 1943. R. W. LUCE 2,319,742
RETRODIRECTIVE REFLECTING DEVICE
Filed Feb. 23, 1940

INVENTOR
RICHARD W. LUCE
BY
George T. Gill
ATTORNEY

Patented May 18, 1943

2,319,742

UNITED STATES PATENT OFFICE 2,319,742

RETRODIRECTIVE REFLECTING DEVICE

Richard W. Luce, Southport, Conn., assignor of one-half to George T. Gill, South Orange, N. J.

Application February 23, 1940, Serial No. 320,267

2 Claims. (Cl. 88—82)

The invention herein disclosed relates to a light-reflecting device of the retrodirective kind.

Reflecting devices of this kind wherein light is reflected back in the general direction of the incident rays are commonly used as roadside warning signs, signals and indicators. Those commonly used may be divided, generally, into two main groups, the "button" type and the plaque type. In signs, signals and indicators using the button type, the indicia are commonly embossed in a metal plate and painted a color different from the background. Along the center line of the embossed indicia a series of buttons are mounted. These buttons have a relatively high reflective efficiency and at night appear illuminated by reflecting the beam of light from an approaching car for example, back in the general direction of the incident beam. The sign, signal or indicator of which such buttons form a part, however, has a very different appearance in daylight than at night. In the daytime they appear as embossed signs and at night as a series of spaced illuminated spots.

Retrodirective, light-reflecting devices of the plaque type may be generally divided into two classes, those which function by virtue of total prismatic reflection and those which consist of a lens and a metalized rear surface. Of the former type, light incident on the front surface thereof does not emerge at the rear surface as it is retrodirectively reflected within the transparent medium by a series of reflections on the surfaces of a prism. This type of device may be formed into letters, spots or other shapes and at night the letters appear illuminated. The refractive and reflecting, or lens mirror reflector may also be shaped into letters, circles, etc. However, this latter type is, as it has been made and constructed, unsuitable for such purposes because of the inability to secure detail and continuity of outline in the reflected beam pattern. None of these devices is suitable or usable to provide a sign, for example, that appears the same at night as in the daytime.

In more recent years there has appeared an arrangement by which a letter or other indicia may be made to appear substantially the same at night as in the daytime. This arrangement consists of painting the indicia or character with a special paint or lacquer and embedding in the paint a multiplicity of relatively small closely related transparent, spherical glass beads. The difficulty with this arrangement is the fact that the reflecting surface, the paint, is at the rear surface of the sphere. It is a well known fact that the focal point of a sphere made of commercial glass is well behind the sphere and not at the surface. In consequence, the light is spread considerably, and the intensity of the reflected beam and the total reflected light returned in the general direction of the incident beam is so low that the arrangement is suitable only for certain specific instances.

By the invention herein disclosed there is provided a light-collecting element and retrodirective light-reflecting device that comprehends the advantage of making a sign appear the same at night, when illuminated by reflection of an incident beam, as it does in the daytime and that is comparable in the total illumination returned in the general direction of the incident beam to the better retrodirective light-reflecting devices now in use. The light-collecting or refracting element of this retrodirective device may be applied to existing signs and the reflected light, giving the appearance of an illuminated sign, will sharply define, lines and changes in the reflective or light absorptive characteristics or color of the reflecting surface without observable interruption. In addition the retrodirective light-reflecting device of this invention is comparatively inexpensive as is the light-collecting or refracting element and its application to existing signs.

A retrodirective, light-reflecting sign embodying the invention is illustrated in the drawing and described in detail below. The drawing includes the following:

Fig. 1 which is an elevation of a sign embodying the invention; and

Figure 2:
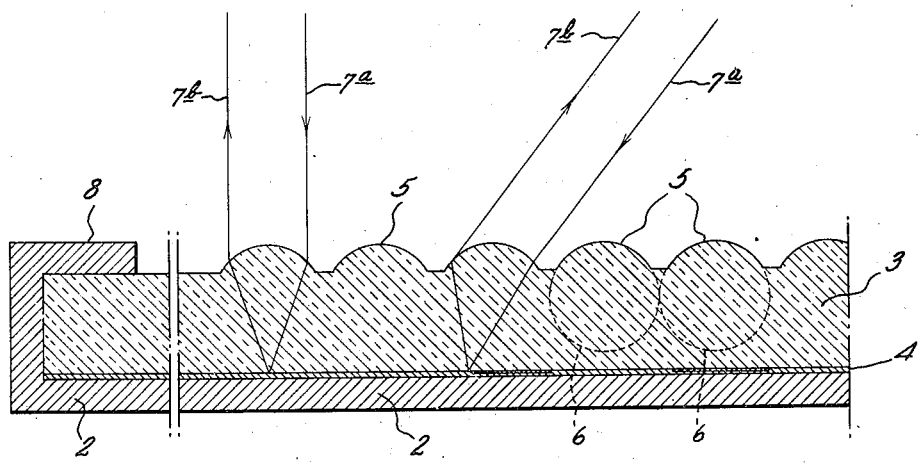

Fig. 2 which is an enlarged fragmentary section of the same.

In Fig. 1 of the drawing, there is illustrated a sign embodying the invention that is especially suitable for mounting at the side of a road that is traveled by automobiles. In the illustration a multiplicity of relatively small, closely related lenses are indicated by stipples 1. However, in a sign mounted beside the road these lenses would not be observable, from the seat of a passing car, for example. A transverse, fragmentary section of the sign is illustrated in Fig. 2. As there shown, the sign consists of a support or backing plate 2, a light-collecting plate 3 and the indicia 4.

The plate 3 is a relatively thin plate of transparent material. This plate, together with the lenses 5 thereon, is approximately 0.037 inch in thickness and somewhat comparable to a veneer. Preferably the plate is molded from a transparent plastic or resin having a comparatively high index of refraction such, for example, as "Polystyrene." The higher the index of refraction of the material of which the plate is formed, the thinner the plate may be and the greater the angular range that may be obtained with a flat reflecting surface. "Polystyrene" has an index of refraction of approximately 1.6.

The lenses 5 are molded on one surface, the front surface of the plate. There are a multiplicity of these light-collecting lenses which are very small and closely related. These lenses are sectors of spheres and arise out of the plate as spherical sectors, that is, the lenses are cut from spheres, such as the spheres indicated by the broken lines 6, by the front surface of the plate. These lenses are uniformly distributed over the surface of the plate and adjacent lenses are spaced apart a distance not greater than the diameter of the spheres of which they form sectors. In a plate of a thickness of 0.037 inch, the lenses would be sectors of spheres having a diameter of one thirty-second of an inch. The lenses constitute a sector that subtends an angle of approximately 120°.

In the sign illustrated, the figure, letters, and lines represented are painted (preferably with a pigment paint) directly on to the back of the plate 3, the film of paint being indicated at 4. If the sign is one in which the figures, letters and lines are black and against a colored background, the black sections, figures, letters and lines are first painted on the back of the plate 3. After these have dried, the whole rear surface of the plate is painted with white paint if the background is to be white or colored paint if the background is to be colored. In like manner, any number of colors and any type of figure or design may be applied to the back of the plate. In fact, it is possible to print a particular character, or figure or other representation on to the back of the plate. This paint, forming the background and the characters, constitutes the reflecting surface of the retrodirective unit.

As is illustrated in Fig. 2, the lenses 5 constitute light-collecting lenses and focus the rays of light falling thereon at the rear surface of the plate. There rays, such as the incoming ray 7a, are reflected from the painted surface and are, by the refraction at the lens surface, returned such as the ray 7b back in the same direction of the incident ray. By virtue of the spherical aberration and the diffused character of the reflecting surface, sufficient spread is obtained in the reflected beam for the reflected light to reach, for example, the eyes of the driver of an automobile, the beam from the headlights of which falls upon the sign. The transparent plate 3 having the back thereof painted with the paint 4 is preferably mounted in the metal backing plate 2 which is desirably brought around the edge of the plate and rolled over the front edge of the plate as at 8.

With the sign above described, the figures, characters and lines which are painted on the back of the light-collecting plate are illuminated in the reflected beam pattern in substantially the same manner as they appear in daylight. The reflecting surface of the sign may have different light reflecting or light absorptive characteristics. For example, if a part of the background be red, the white light incident upon that particular portion of the sign will, with the exception of the red light rays, be absorbed by the background. The red rays will, however, be returned in substantially the same direction as the incident rays of white light. The lenses are so closely related that variations or transitions in the characteristics of the reflecting surface behind the light collecting and distributing plate are indicated in the reflected beam with minuteness of detail and without observable interruptions. It is because of this that the sign appears practically the same whether observed in the daytime or whether observed from behind a beam of light falling thereon such as the beam of light from the headlamps of an automobile. The lenses collect a series of pencils of light which are returned in the same general direction with a slight spread and the redirected pencils are so closely related that they appear to the eye as a general illumination of the sign.

It will be apparent that in the light-collecting unit above described the closer the lenses, within the limits of desirable angularity the more lenses there are per unit of area of the plate and in consequence, the greater the detail of the reflected image and the greater total illumination effected by the reflected light. In the embodiments illustrated herein adjacent lenses are spaced apart, center to center, a distance equal to the diameter of the spheres of which the lenses form sectors. In this particular embodiment the relation exists because of a particular method and of mold construction. There are approximately twelve hundred lenses for each square inch of surface of the plate. Since, however, only approximately 90° of angle is necessary for the lenses to have the requisite aperture and angularity, the lenses may be brought closer together with an attendant increase in the total illumination. Preferably, the lenses are arranged so that adjacent lenses subtend an angle of 90° and are in contact.

For a roadside sign, the plane reflector surface, the diffusing character of the reflecting surface, the spherical lenses and the high index of refraction of the resin provide the right combination. The plane reflector surface is located at the focal point of axial rays. As the incident rays depart from the axis the reflecting surface is progressively farther away from the focal point of the lens. Thus, in a roadside sign, the distant incident rays are returned with a minimum divergence and as the light source approaches, the divergence increases with attendant greater angularity. The condition is desirable in roadside signs as a high intensity with a minimum of divergence provides illumination at a greater distance, while as the light source approaches greater angularity is desirable and this is secured by the greater divergence.

An important advantage of the sign described above is that it permits of standardization with the attendant benefits. Commonly, roadside warning signs are of a fixed dimension, the indicia and copy vary. With this sign, the supporting plates and light-collecting elements may be made in standard sizes. Any variations in the signs will be in the indicia or copy which is painted on the back of the light-collecting plate.

It will be obvious that various changes may be made by those skilled in the art in the details of the embodiments of the invention illustrated in the drawing and described in detail above within the principle and scope of the invention as expressed in the appended claims.

I claim:

1. A retrodirective, light-reflecting device of the kind described comprising in combination a relatively thin plate of moldable, transparent material having a plane rear surface and a multiplicity of relatively small, substantially spherical, light-collecting lenses on the front surface formed integral therewith and of a radius of curvature of less than one thirty-second of an inch, the lenses being sectors of spheres cut by the front surface of the plate and the thickness of the plate including the lenses, the radius of curvature of the lenses and the index of refraction of the transparent material being optically related in the relation of thirty-seven-thousands of an inch, one sixty-fourth of an inch and one and six-tenths, and an opaque, light-reflecting medium having different light-reflecting characteristics at the rear surface of the plate behind the lenses, the lenses being uniformly distributed over the surface of the plate and sufficiently closely related to sharply define in the reflected light without observable distortion transitions in the light-reflecting characteristics of the light reflecting medium at the rear of the plate.

2. For a retrodirective, light-reflecting device of the kind described, a light-collecting and directing element comprising in combination a relatively thin plate of moldable, transparent material having a plane rear surface and a multiplicity of relatively small, substantially spherical, light-collecting lenses on the front surface formed integral therewith and of a radius of curvature of less than one thirty-second of an inch, the lenses being sectors of spheres cut by the front surface of the plate and the thickness of the plate including the lenses, the radius of curvature of the lenses and the index of refraction of the transparent material being optically related in the relation of thirty-seven-thousandths of an inch, one sixty-fourth of an inch and one and six-tenths, and the lenses being uniformly distributed over the surface of the plate.

RICHARD W. LUCE.